(12) United States Patent
Shpunt

(10) Patent No.: US 10,739,599 B2
(45) Date of Patent: Aug. 11, 2020

(54) PREDICTIVE, FOVEATED VIRTUAL REALITY SYSTEM

(71) Applicant: Apple Inc., Cupertino, CA (US)

(72) Inventor: Alexander Shpunt, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/448,846

(22) Filed: Jun. 21, 2019

(65) Prior Publication Data

US 2020/0012106 A1  Jan. 9, 2020

Related U.S. Application Data

(63) Continuation of application No. 15/711,933, filed on Sep. 21, 2017, now Pat. No. 10,330,935.

(Continued)

(51) Int. Cl.
*G02B 27/01* (2006.01)
*G06F 3/01* (2006.01)
(Continued)

(52) U.S. Cl.
CPC ....... *G02B 27/0172* (2013.01); *G02B 27/017* (2013.01); *G06F 3/011* (2013.01);
(Continued)

(58) Field of Classification Search
CPC .............. G02B 27/0172; G02B 27/017; G02B 2027/0187; G02B 2027/0138;
(Continued)

(56) References Cited

U.S. PATENT DOCUMENTS 6,351,335 B1  2/2002 Perlin
7,010,169 B2  3/2006 Kortum et al.
(Continued)

FOREIGN PATENT DOCUMENTS

EP      1403680      3/2004
WO    2014197226   12/2014

OTHER PUBLICATIONS

Invitation to Pay from PCT/U92017/053103, Dated Jan. 4, 2018, Apple Inc., pp. 1-15.

*Primary Examiner* — Ibrahim A Khan
(74) *Attorney, Agent, or Firm* — Robert C. Kowert; Kowert, Hood, Munyon, Rankin & Goetzel, P.C.

(57) ABSTRACT

A Predictive, Foveated Virtual Reality System may capture views of the world around a user using multiple resolutions. The Predictive, Foveated Virtual Reality System may include one or more cameras configured to capture lower resolution image data for a peripheral field of view while capturing higher resolution image data for a narrow field of view corresponding to a user's line of sight. Additionally, the Predictive, Foveated Virtual Reality System may also include one or more sensors or other mechanisms, such as gaze tracking modules or accelerometers, to detect or track motion. A Predictive, Foveated Virtual Reality System may also predict, based on a user's head and eye motion, the user's future line of sight and may capture image data corresponding to a predicted line of sight. When the user subsequently looks in that direction the system may display the previously captured (and augmented) view.

20 Claims, 10 Drawing Sheets

Related U.S. Application Data

(60) Provisional application No. 62/398,414, filed on Sep. 22, 2016.

(51) Int. Cl.
| | |
|---|---|
| *H04N 13/344* | (2018.01) |
| *H04N 13/366* | (2018.01) |
| *H04N 13/25* | (2018.01) |
| *H04N 13/398* | (2018.01) |
| *H04N 13/376* | (2018.01) |
| *H04N 13/383* | (2018.01) |
| *H04N 13/38* | (2018.01) |
| *H04N 13/373* | (2018.01) |

(52) U.S. Cl.
CPC ............ *G06F 3/013* (2013.01); *H04N 13/25* (2018.05); *H04N 13/344* (2018.05); *H04N 13/366* (2018.05); *H04N 13/373* (2018.05); *H04N 13/376* (2018.05); *H04N 13/38* (2018.05); *H04N 13/383* (2018.05); *H04N 13/398* (2018.05); *G02B 2027/0138* (2013.01); *G02B 2027/0147* (2013.01); *G02B 2027/0187* (2013.01)

(58) Field of Classification Search
CPC . G02B 2027/0147; G06F 3/011; G06F 3/013; H04N 13/344; H04N 13/366; H04N 13/25; H04N 13/398; H04N 13/376; H04N 13/383; H04N 13/38; H04N 13/373
See application file for complete search history.

(56) References Cited

U.S. PATENT DOCUMENTS

| | | |
|---|---|---|
| 8,721,341 B2 | 5/2014 | Mitchell |
| 9,230,302 B1 | 1/2016 | Owechko et al. |
| 9,316,834 B2 | 4/2016 | Makino et al. |
| 10,062,182 B2* | 8/2018 | Haddick ............ G02B 27/0093 |
| 10,330,935 B2 | 6/2019 | Shpunt |
| 2004/0227703 A1 | 11/2004 | Lamvik et al. |
| 2005/0117015 A1 | 6/2005 | Cutler |
| 2010/0056274 A1 | 3/2010 | Uusitalo et al. |
| 2013/0016178 A1 | 1/2013 | Birkbeck et al. |
| 2014/0218468 A1 | 8/2014 | Gao et al. |
| 2014/0247277 A1 | 9/2014 | Guenter et al. |
| 2015/0178939 A1 | 6/2015 | Bradski et al. |
| 2015/0243102 A1 | 8/2015 | Schowengerdt |
| 2016/0116745 A1* | 4/2016 | Osterhout ........... G06F 3/03547 359/614 |
| 2016/0166146 A1* | 6/2016 | Sarkar ................... A61B 3/113 351/210 |
| 2017/0195653 A1* | 7/2017 | Trail .................... H04N 13/254 |
| 2017/0263007 A1* | 9/2017 | Cavin ..................... G06T 7/251 |
| 2017/0276934 A1* | 9/2017 | Sarkar ................... A61B 3/113 |
| 2017/0365230 A1* | 12/2017 | Hu ......................... G09G 5/003 |
| 2018/0040164 A1* | 2/2018 | Newman ............... G06T 15/205 |
| 2018/0061116 A1* | 3/2018 | Mitchell ................ G06F 3/011 |
| 2018/0068449 A1* | 3/2018 | Malaika .................. G06T 7/277 |
| 2018/0232048 A1* | 8/2018 | Popovich .............. A61B 3/113 |
| 2018/0359189 A1* | 12/2018 | Ye ........................... G06F 3/012 |
| 2019/0187482 A1* | 6/2019 | Lanman ............. G02B 27/0172 |

\* cited by examiner

PREDICTIVE, FOVEATED VIRTUAL REALITY SYSTEM

This application is a continuation of U.S. patent application Ser. No. 15/711,933, filed Sep. 21, 2017, which claims benefit of priority to U.S. Provisional Application No. 62/398,414, filed Sep. 22, 2016, titled "Predictive, Foveated Virtual Reality System," which are hereby incorporated by reference in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) combines computer generated information with real world images to augment, or add content to, a user's view of the world. The simulated environments of virtual reality and/or the enhanced content of augmented reality may thus be utilized to provide an interactive user experience for multiple applications, such as interacting with virtual training environments, gaming, remotely controlling devices or other mechanical systems, viewing digital media content, interacting with the internet, or the like.

However, conventional virtual reality and augmented reality systems may also suffer from latency problems potentially cause eyestrain, headaches, and/or nausea. For example, conventional virtual reality and augmented reality systems may involve significant lag times between the time a user looks in a particular direction and the time that the system is able to display the corresponding scene to the user. Additionally, the amount of image data required to be captured, generated and/or displayed to the user of a conventional virtual reality system may be so large as to affect the performance of the system (e.g., increased latency) and to increase the cost and/or size of the system.

SUMMARY

Methods and systems for a virtual reality (VR) and/or augmented reality (AR) device (e.g., a headset, or head mounted, device) may include a predictive, foveated virtual reality system. A predictive, foveated virtual reality system may be configured to capture views of the world around a user of the system, augment the captured data, generate an augmented view of the world and display that view to the user via a display of the system.

A predictive foveated virtual reality system as described herein may also be configured to capture (and render) image data using more than one resolution, such as to possibly reduce overall overhead, cost, workload. For instance, a virtual reality system may include one or more cameras (or camera systems) configured to capture both low resolution and high resolution image data. Low (or lower) resolution image data may be captured for a wide field of view (e.g., the periphery) while high (or higher) resolution image data may be captured for a narrow field of view (e.g., corresponding to a user's line of sight). Thus, in some embodiments, a predictive, foveated virtual reality system may include one or more lower resolution cameras, as well as one or more higher resolution cameras.

Additionally, a virtual reality system may be configured anticipate a user's movements, such as to look ahead, in order to capture image data, as well as prepare the image data for display, for a predictive, future line of sight, according to some embodiments. For example, a virtual reality system may be able to determine, based on a user's head and/or eye motion, a predictive line of sight vector along which to capture image data. When the user actually looks in that direction (e.g., the user's actual line of sight approaches the predictive line of sight vector), the system may then display the previously captured (and augmented) view.

Additionally, a predictive, foveated virtual reality system may include one or more sensors and/or mechanisms configured to detect, determine and/or track motion. For example, a predictive, foveated virtual reality system may include one or more gaze tracking modules configured to detect, determine and/or track eye motion for a user of the system. Similarly, a predictive, foveated virtual reality system may include one or more accelerometers, gyroscopes, and/or other components, configured to detect, determine and/or track general motion of the system and/or of a user's head while wearing/using the system.

In various embodiments of a Predictive, Foveated Virtual Reality System as described herein, either the foveal camera component or the look ahead component may be used, or both may be used in combination.

Figure 1:
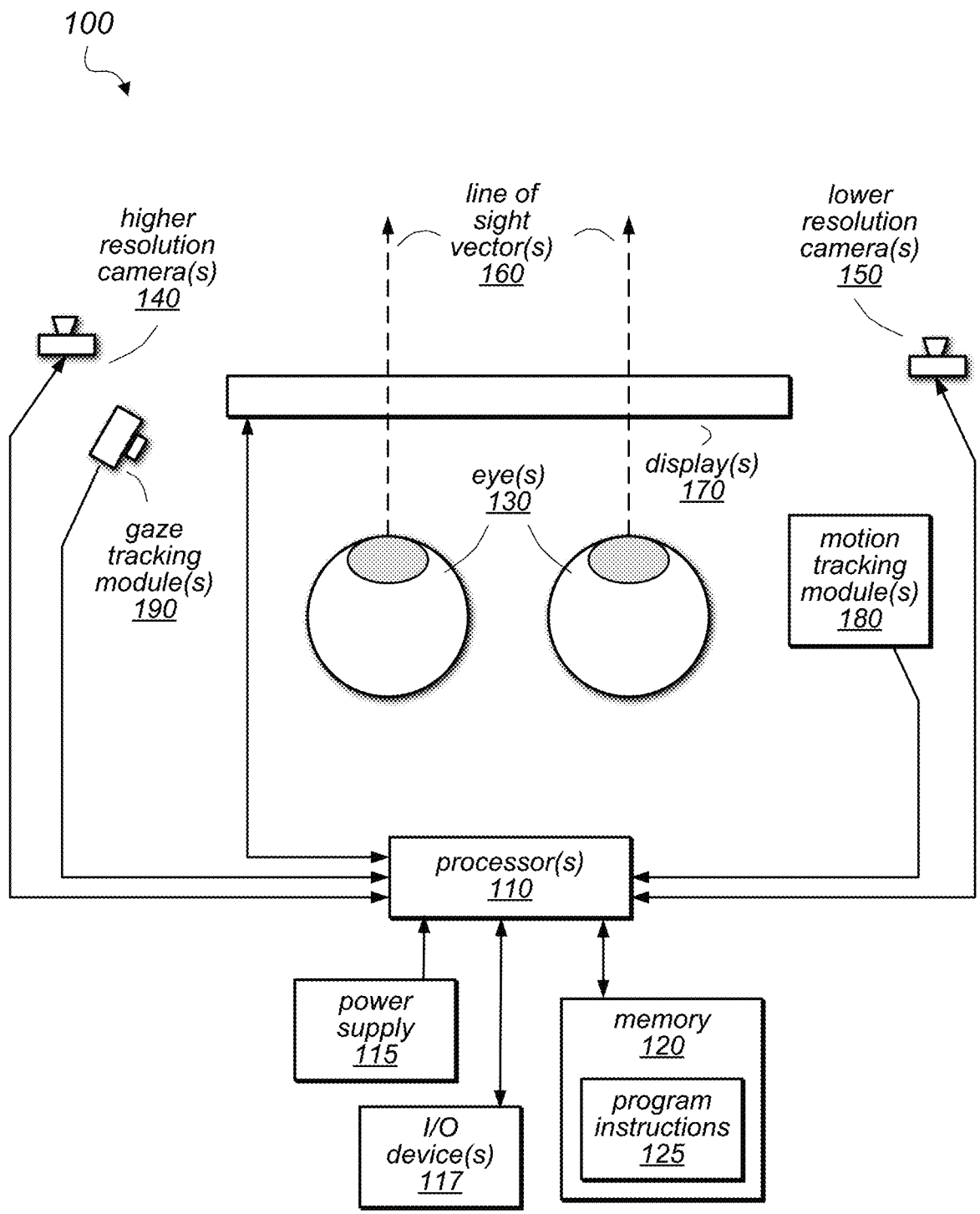
FIG. 1 is a logical diagram illustrating part of a system configured to implement a Predictive, Foveated Virtual Reality System, according to one embodiment.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of a virtual reality device are described that implement predictive, foveated virtual reality system. Methods and systems for a virtual reality (VR) and/or augmented reality (AR) device (e.g., a headset, or head mounted, device) may include a predictive, foveated virtual reality system. A predictive, foveated virtual reality system may be configured to capture views of the world around a user of the system, augment the captured data, generate an augmented view of the world and display that view to the user via a display of the system.

As noted above, predictive foveated virtual reality system, as described herein, may also be configured to capture (and render) image data using more than one resolution, such as to possibly reduce overall overhead, cost, workload. For instance, a virtual reality system may include one or more cameras (or camera systems) configured to capture both low resolution and high resolution image data. Low (or lower) resolution image data may be captured for a wide field of view (e.g., the periphery) while high (or higher) resolution image data may be captured for a narrow field of view (e.g., corresponding to a user's line of sight). Thus, in some embodiments, a predictive, foveated virtual reality system may include one or more lower resolution cameras, as well as one or more higher resolution cameras.

FIG. 1 is a logical diagram illustrating part of a system configured to implement a Predictive Foveated Virtual Reality System, according to one embodiment. A system, such as system 100, may be configured to implement a virtual/artificial/augmented reality system including a Predictive Foveated Virtual Reality System. For instance, system 100 may include a processor(s) 110 as well as one or more higher resolution cameras 140 and one or more lower resolution camera(s) 150. In some embodiments, a Predictive Foveated Virtual Reality System may be configured to generate a (potentially augmented) view for a user of the system based on captured image data of a scene toward which the user is looking and to render that view to one or more displays, such as display(s) 170, for viewing by the user. In some embodiments, system 100 may include a single display viewable to the user via both eye, while in other embodiments, system 100 may include multiple displays, such as one for each eye.

A Predictive Foveated Virtual Reality System as described herein may in some embodiments be configured to capture (and render) image data using more than one resolution, such as to possibly reduce overall overhead, cost, workload. For instance, a system 100 may include one or more lower resolution cameras 150 configured to lower resolution image data and may also include one or more higher resolution cameras 140 configured to capture higher resolution image data. In some embodiments, higher resolution camera(s) 140 may be configured to capture image data that is high (perhaps extremely high) resolution, but only over a small number of degrees (e.g., of field of view). In other embodiments, higher resolution camera(s) 140 may be, or may represent, one or more wide field of view (wide-FOV) cameras. Low (or lower) resolution image data may be captured for a wide, or wider, field of view (e.g., for the periphery) while high (or higher) resolution image data may be captured for a narrow, or narrower, field of view (e.g., corresponding to a user's line of sight).

When capturing image data, the system 100 may be configured to determine and utilize a vector representing, and/or approximating, the user's line of sight. For example, system 100 may be configured to capture image data (both lower and higher resolution image data) along a determined line of sight vector 160 for the user. In some embodiments, both the lower resolution image data and the higher resolution image data may be captured over fields of view centered on the line of sight vector 160. In other embodiments, lower resolution image data may be captured over a field of view centered on a vector corresponding to the user's current head position, such as corresponding to a vector that would represent the user's line of sight if the user were looking directly ahead. Thus, in some embodiments, the system 100 may be configured to capture lower resolution image data over a field of view directly to the front of the user's (and thus the system's) current position and/or orientation while capturing higher resolution image data for a narrower field of view centered on a vector corresponding to the user's current line of sight (e.g., gaze direction).

System 100 may be configured to capture image data corresponding to a scene (e.g., toward which the user may be looking) and use that captured image data to render a (possibly augmented) view on a display(s) 170 viewable by the user.

Additionally, when capturing image data, a Predictive, Foveated Virtual Reality System may be configured to utilizing information regarding the user's current head position and current line of sight. Thus, system 100 may include one or more sensors and/or mechanisms configured to detect, determine and/or track motion. In some embodiments, system 100 may include one or more gaze tracking modules configured to detect, determine and/or track eye motion for a user of the system. For example, system 100 may be configured to utilize information regarding the user's current eye position and/or motion (e.g., line of size, gaze direction, etc.) based on output from a gaze tracking module 190. System 100 may also include one or more accelerometers configured to detect, determine and/or track general motion of the system and/or of a user's head while wearing/using the system. Similarly, system 100 may be configured to utilize information regarding the user's current head position, movement, trajectory, alignment, and/or motion based output from a motion tracking module 180.

System 100 may represent any of various types of systems, according to various embodiments. For instance, in one embodiment, system 100 may represent a head mounted display system configured to be worn on a user's head and over the user's eyes. In another embodiment, system 100 may represent a goggle-based system configured to be work on a user's head that includes one or more displays in front of the user's eyes. In yet other embodiments, system 100 may represent a system that includes one or more direct retinal displays configured to project image data directly onto the user's eye(s). In some embodiments, display(s) 170 may be a single display device viewable by one or both of the user's eyes. In other embodiments, display(s) 170 may represent two (or more) independent displays each viewable by one or both of the user's eyes. In some embodiments, system 100 (especially cameras 140 and 150, as well as display(s) 170) may be configured, to capture and/or produce two dimensional (2D) images and/or image data, while in other embodiments, system 100 (especially cameras 140 and 150, as well as display(s) 170) may be configured, to capture and/or produce three dimensional (3D) images and/or image data.

Additionally, in some embodiments, system 100 may represent a system in which processor(s) 110, display(s) 170, higher resolution camera(s) 140, lower resolution camera(s) 150, gaze tracking module(s) 190, and motion tracking module(s) 180 are part of, or comprised within, a single device, such as a head mounted display. In other embodiments, however, one or more components of system 100 may be remote from, and configured to communicate with, others of the components of system 100. For instance, in one embodiment, display(s) 170, higher resolution camera(s) 140, lower resolution camera(s) 150, gaze tracking module (s) 190, and motion tracking module(s) 180 may be part of a head mounted display device, while processor(s) 110 may be separate from such a device (e.g., processor 100 may be worn separately from the head mounted display or may reside in a separate, non-wearable, device). Furthermore, in some embodiments, higher resolution camera(s) 140, lower resolution camera(s) 150 may reside in a remote location and be configured to capture and display image data corresponding to a scene the user might see if the user was at the remote location.

While using the system 100, a subject may move their eyes. In addition, different subject's eyes may be differently spaced. In some embodiments, to avoid distortion in a projected image due to eye orientation and/or spacing, gaze tracking technology may be used to dynamically adjust the virtual image projected by the system 100 according to the subject's current eye orientation. Gaze tracking module(s) 190 may monitor the orientation of the subject's eye(s) 130 and transmit the eye orientation data to the processor(s) 110. The processor(s) 110 may dynamically determine line of sight vector(s) 160 according to the eye orientation data, including output from gaze tracking module(s) 190.

One example embodiment of a Predictive, Foveated Virtual Reality System, as described herein may comprise a frame configured to hold various element or components of system 100. For instance, a frame may include one or more displays 170 via which system 100 may display (e.g., render) views to the user. The frame may also hold, enclose, or comprise, higher resolution camera(s) 140, lower resolution camera(s) 150, gaze tracking module(s) 190, and motion tracking module(s) 180.

In different embodiments, system 100 may include any of various types of devices including, but not limited to: a personal computer system; a laptop computer; a notebook, tablet, slate, or netbook computer; a handheld computer; a mobile device, such as a mobile phone, tablet device, or music player; a video game console; a handheld video game device; or in general any type of computing or electronic device that includes the functionality of generating images for a virtual reality and/or augmented reality system. In some embodiments, system 100 and/or processor(s) 110 may include more or fewer elements than those shown in FIG. 1.

In various embodiments, processor(s) 110 may be a uniprocessor system including one processor, or a multiprocessor system including several processors (e.g., two, four, eight, or another suitable number). Processor(s) 110 may include central processing units (CPUs) configured to implement any suitable instruction set architecture, and may be configured to execute instructions defined in that instruction set architecture. For example, in various embodiments processor(s) 110 may be general-purpose or embedded processors implementing any of a variety of instruction set architectures (ISAs), such as the x86, PowerPC, SPARC, RISC, or MIPS ISAs, or any other suitable ISA. In multiprocessor systems, each of processor(s) 110 may commonly, but not necessarily, implement the same ISA. Processor(s) 110 may employ any microarchitecture, including scalar, superscalar, pipelined, superpipelined, out of order, in order, speculative, non-speculative, etc., or combinations thereof. Processor 425 may include circuitry to implement microcoding techniques. Processor(s) 110 may include one or more processing cores each configured to execute instructions. Processor(s) 110 may include one or more levels of caches, which may employ any size and any configuration (set associative, direct mapped, etc.).

In the example system 100, memory 120 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMIVIs), etc. Alternatively, the devices may be mounted with an integrated circuit implementing system 100 in a chip-on-chip configuration, a package-on-package configuration, or a multi-chip module configuration. In some embodiments, system memory 120 may store pixel data or other image data or statistics in various formats. Similarly, while the example system 100 includes, according to one embodiment, persistent storage for non-volatile storage of image data or other data used in the system, in other embodiments, the system may include other types of non-volatile memory (e.g. read-only memory (ROM)) for those purposes. In some embodiments, memory 120 may include data, such as program instructions 125.

Processor(s) 110 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. The amount of hardware and software implementation may vary from embodiment to embodiment.

I/O devices 117 may include any desired circuitry, depending on the type of system 400. For example, in some embodiments, system 100 may be configured to interface with a mobile computing device (e.g. personal digital assistant (PDA), tablet device, smart phone, etc.), and the I/O devices 117 may include devices for various types of wireless communication, such as WiFi, Bluetooth, cellular, global positioning system, etc. In some embodiments, I/O devices 117 may also include additional storage, including RAM storage, solid state storage, or disk storage. In some embodiments, I/O devices 117 may include user interface devices such as additional display devices, including touch display screens or multi-touch display screens, power buttons, input buttons, control keys, keyboards, keypads, touchpads, scanning devices, voice or optical recognition devices, microphones, speakers, scanners, printing devices, or any other devices suitable for entering or accessing data by, or within, system 100.

In some embodiments, processor(s) 110 may include an image signal processor (ISP), which may include dedicated hardware that may facilitate the performance of various stages of an image processing pipeline. In some embodiments, processor(s) 110 and/or an ISP may be configured to receive image data from an external source and/or from one or more data files stored in memory 120 and to process the data into a form that is usable by other components of system 100 (including, but limited to, gaze tracking module(s) 190, program instructions 125, and/or I/O devices 117). In some embodiments, processor(s) 110 and/or an ISP may be configured to perform various image procession and manipulation operations including one or more of, but not limited to, image translation operations, horizontal and vertical scaling, non-uniformity correction, filtering, non-uniformity reduction, color space conversion or other non-warping image editing operations, or image stabilization transformations.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or additional functionality may be available. In some embodiments program instructions 125 (e.g., stored in memory 120) may be executed by processor(s) 110 to provide various functions of system 100.

In some embodiments, various functions may be performed by software components executing in memory on another device and communicating with the illustrated system via inter-computer (or inter-device) communication. Some or all of these software components or any data structures described herein may be stored (e.g., as instructions or structured data) in system memory 120, in persistent storage, or may be stored on a non-transitory computer-readable medium or a portable article to be read by an appropriate drive connected to I/O device(s) 117. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
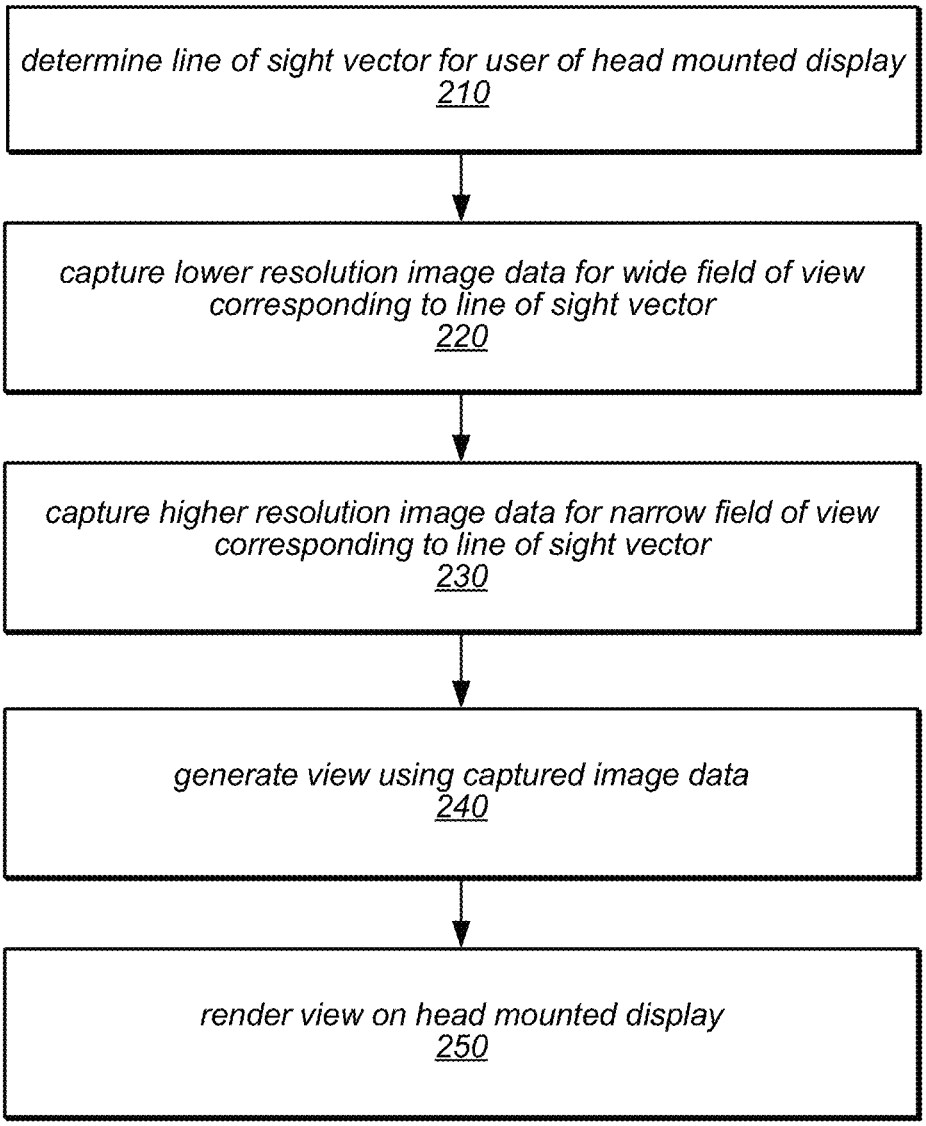
FIG. 2 is a flowchart illustrating one embodiment of a method for implementing a Predictive, Foveated Virtual reality system, as described herein.

FIG. 2 is a flowchart illustrating one embodiment of a method for implementing a Predictive, Foveated Virtual Reality System, as described herein. In one embodiment, a system configured to implement a Predictive, Foveated Virtual Reality System, such as system 100, may determine a line of sight vector for a user of a head mounted display, as shown in block 210. The determined line of sight vector may be based on the user's current head position and/or the user's current gaze direction, according to various embodiments. In some embodiments, the system may be configured to utilize the user's gaze direction, such as determined by, gaze tracking module 190 to determine the line of sight vector.

Additionally, the system may capture low resolution image data for a wide field of view corresponding to the determined line of sight vector, as in block 220. In some embodiments, the low resolution image data may be captured over a large field of view corresponding to an overall field of view for the users. This captured image data may be the basis for a background or peripheral area of a view to be displayed for the user. In some embodiments, the system may include one or more low resolution cameras as part of a head mounted display (or other headgear) and the low resolution camera(s) may be configured to capture image data directly to the front of the user (e.g., directly to the front of the head mounted system.). In other embodiments, the low resolution camera(s) may be configured to capture image data over a field of view centered around the direct front of the user (or the head mounted system). In yet other embodiments, the low resolution camera's may be configured to capture image data for a field of view centered around the determined line of sight vector even if that line of sight vector is not directly to the front of the user (or head mounted system).

As shown in block 230, the system may also capture high resolution image data for a narrow field of view corresponding to the determined line of sight vector. For instance, as noted above, the system may include both lower resolution camera(s) and higher resolution camera(s) and the system may be configured to capture both low and high resolution image data. In some embodiments, the system may include one or more high resolution cameras as part of a head mounted display (or other headgear) and the high resolution camera(s) may be configured to over a field of view centered around the determined line of sight vector even if that line of sight vector is not directly to the front of the user (or head mounted system). In some embodiments, the field of view over which high (or higher) resolution image data is captured may be smaller (possibly significantly smaller) that the field of view over which the low (or lower) resolution image data is captured. Additionally, according to some embodiments, the lower resolution image data may represent the background or peripheral area of a user's view while the higher resolution image data may represent a focal or center portion of the user's view.

The terms "low", "lower", "high" and "higher" as used herein in reference to resolution of captured image data, do not refer to any particular resolutions, but are used to contrast the different resolutions that may be captured by the system when implementing a Predictive Foveated Virtual Reality System, as described herein. Thus, image data captured by one or more lower resolution cameras may be considered to have a lower pixel density (e.g., fewer pixels per arc minute, pixels per inch, etc.) than image data captured by one or more higher resolution cameras, according to various embodiments.

Additionally, as in block 240, system 100 may be configured to generate a view using the captured image data. For example, system 100 may be configured to combine the lower resolution image data with the higher resolution image data to generate a single view. In some embodiments, system 100 and/or processor(s) 110 may be configured to replace (e.g., overwrite) a portion of the lower resolution image data with the higher resolution image data in order to generate a foveated view of the scene at which the user is looking, according to one embodiment. In other embodiments, the system may not actually overwrite or replace a portion of the lower resolution image data, but rather may simply not utilizing a portion of the lower resolution image data (that corresponds to the higher resolution image data) when generating the view. Additionally, in some embodiments, the system may also augment the view with additional features (and/or additional imaged data), such as to include textual or graphical overlays, etc., when generating the view.

When generating a view corresponding to a line of sight vector, system 100 may be configured to apply and/or perform various image procession and/or manipulation operations including one or more of, but not limited to, image translation operations, horizontal and vertical scaling, non-uniformity correction, filtering, non-uniformity reduction, color space conversion or other non-warping image editing operations, or image stabilization transformations, such as to captured image data, separate image data used to augment the view, or to the view (in whole or in part) itself. For example, system 100 may apply one or more image processing and/or manipulation operations when combining the captured lower resolution image data with the captured higher resolution image data, such as to blend (e.g., the edges of) the higher resolution image data with the lower resolution image data.

The system may then render the generated view on the head mounted display for the user, as in block 250. Thus, the system may generate and render a, possibly augmented, view of the scene at which the user is looking. While described herein in terms of capturing and augmenting the actual scene that is physically around the user, in some embodiments, the scene being captured may be physically remote from the user. For example, in one embodiment, the cameras may be mounted on a remote system configured to model and/or mimic the head and/eye motions of the user and thus to capture image data corresponding to a scene that the user would see if the user were located at the remote location.

Figure 3:
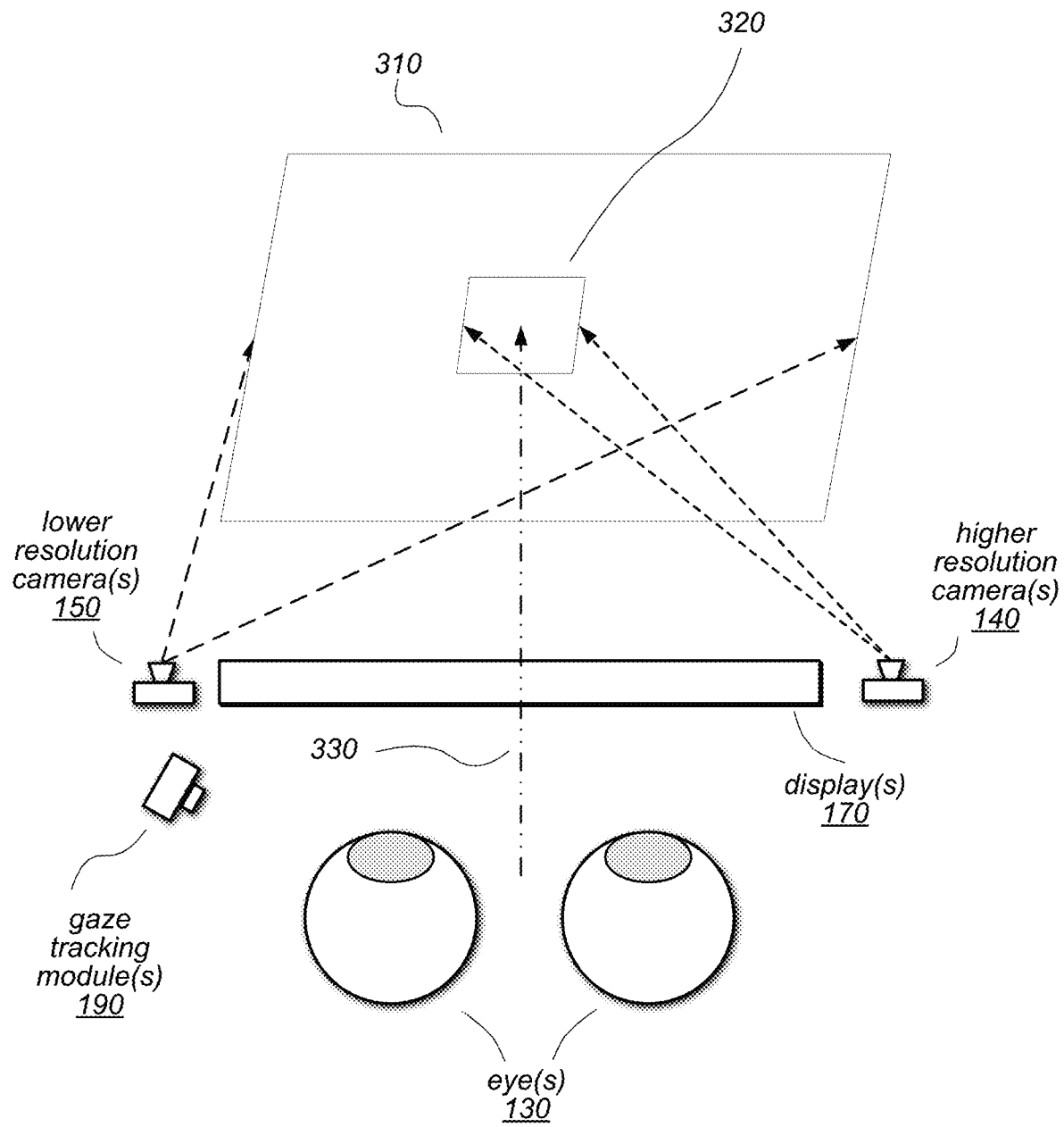
FIG. 3 is a logical diagram illustrating one embodiment of Predictive, Foveated Virtual Reality System configured to capture image data corresponding to user's line of sight.

As described above, system 100 may be configured to capture image data at multiple resolutions corresponding to a user's line of sight. FIG. 3 is a logical diagram illustrating one embodiment of system 100 capturing image data corresponding to user's line of sight. Please note that the physical arrangement of the components illustrated in FIG. 3 are merely for logical explanation and do not necessarily bear any similarity to any actual arrangement of components within any particular embodiment of a Predictive, Foveated Virtual Reality System as described herein. As illustrated in FIG. 3, system 100, may be configured to capture higher resolution image data, such as via higher resolution camera(s) 140 over a narrow (e.g., narrower) field of view, such as field of view 320. Field of view 320 may, in some embodiments correspond to, or be centered on, or be captured along, a user's line of sight 330 (or along a line of sight vector determined based on line of sight 330). Similarly, system 100, may be configured to capture lower resolution image data, such as via lower resolution camera(s) 150 over a wide (e.g., wider) field of view, such as field of view 310.

As described previously, line of sight 330 may be determined based, at least in part, on output of gaze tracking module(s) 190. For example, processor(s) 110 may be configured to utilize output from gaze tracking module(s) 190 to determine line of sight 330 and may adjust higher resolution camera(s) 140 to be able to capture image data corresponding to field of view 320. Processor(s) 110 may also be configured to utilize output from gaze tracking module(s) 190 to determine line of sight 330 and may adjust lower resolution camera(s) 150 to be able to capture image data corresponding to field of view 310. Alternatively, in other embodiments, gaze tracking module(s) 190 may be configured to determine line of sight 330 and communicate the line of sight 330 to other components of the system, such as to processor(s) 110, higher resolution camera(s) 140 and/or lower resolution camera(s) 150.

Field of view 310 may, in some embodiments correspond to, or be centered on, or be captured along, a user's line of sight 330. In some cases, such as when a user is looking straight ahead, field of view 310 and field of view 320 may both be centered on a single (imaginary) point along line of sight 330, according to some embodiments. Additionally, in some embodiments, field of view 310 and field of view 320 may not be centered around a single (imaginary) point along line of sight 330, as will be described in more detail below.

Thus, in some embodiments, system 100 and/or processor(s) 110 may be configured to capture image data at multiple resolutions, combine and/or augment the captured image data and display a view to the user via display(s) 170. The display view may include at least some of the captured lower resolution image data, at least some of the captured higher resolution image data and possibly additional (e.g., non-captured) image data (e.g., to augment the captured image data), according to some embodiments.

Figure 4:
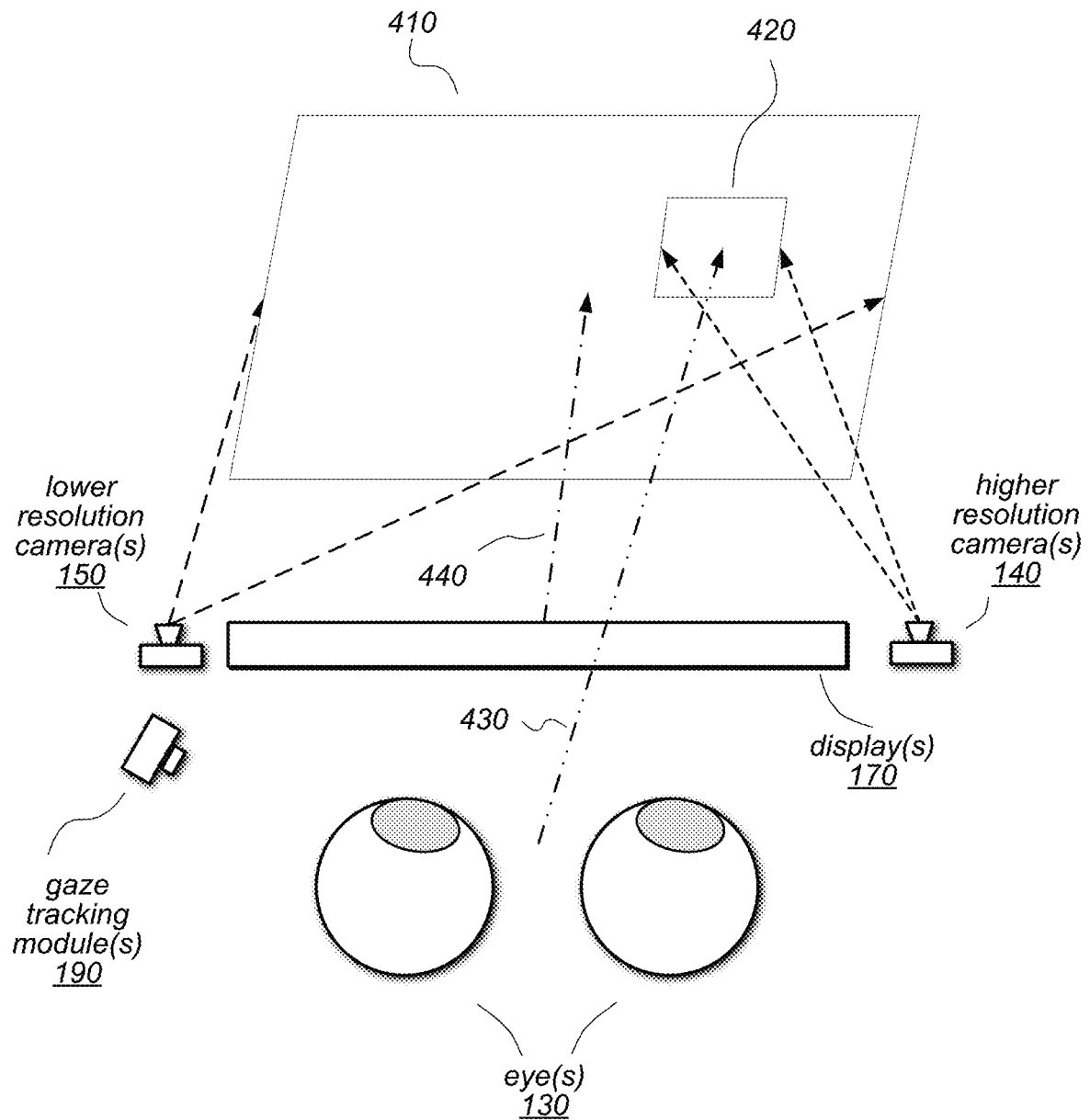
FIG. 4 and FIG. 5 are a logical diagrams illustrating one embodiment of Predictive, Foveated Virtual Reality System configured to capture image data centered on multiple different angles of view.

As described above, system 100 may be configured to capture image data at multiple resolutions centered on multiple different angles of view. FIG. 4 is a logical diagram illustrating one embodiment of system 100 capturing image data centered on multiple different angles of view. Please note that the physical arrangement of the components illustrated in FIG. 4 are merely for logical explanation and do not necessarily bear any similarity to any actual arrangement of components within any particular embodiment of a Predictive, Foveated Virtual Reality System as described herein. As illustrated in FIG. 4, system 100, may be configured to capture higher resolution image data, such as via higher resolution camera(s) 140 over a narrow (e.g., narrower) field of view, such as field of view 420. Field of view 420 may, in some embodiments correspond to, or be centered on, or be captured along, a user's line of sight 430 (or along a line of sight vector determined based on line of sight 430). Similarly, system 100, may be configured to capture lower resolution image data, such as via lower resolution camera(s) 150 over a wide (e.g., wider) field of view, such as field of view 410.

As described previously, line of sight 430 may be determined based, at least in part, on output of gaze tracking module(s) 190. For example, processor(s) 110 may be configured to utilize output from gaze tracking module(s) 190 to determine line of sight 430 and may adjust higher resolution camera(s) 140 to be able to capture image data corresponding to field of view 420. Processor(s) 110 may also be configured to utilize output from gaze tracking module(s) 190 to determine line of sight 430 and may adjust lower resolution camera(s) 150 to be able to capture image data corresponding to field of view 410. Alternatively, in other embodiments, gaze tracking module(s) 190 may be configured to determine line of sight 430 and communicate the line of sight 430 to other components of the system, such as to processor(s) 110, higher resolution camera(s) 140 and/or lower resolution camera(s) 150.

Field of view 410 may, in some embodiments correspond to, or be centered on, or be captured along, an angle corresponding to an alignment of the user's head (and/or of a device worn by the user). For example, field of view 410 may correspond to an angle of view 440 which the user may might see if the user was looking directly ahead). However, field of view 410 and field of view 420 may not be centered around a single (imaginary) point along a single angle of view. For example, lower resolution camera(s) 150 may be configured to capture image data along an angle of view 440 corresponding to a line of view directly ahead of the user (e.g., based on the user's head position and consequently the position of a head mounted display worn by the user) while higher resolution camera(s) 140 may be configured to capture image data along an angle of view corresponding to the user's current line of sight 430, such as may be based on information detected by gaze tracking module(s) 190.

Figure 5:
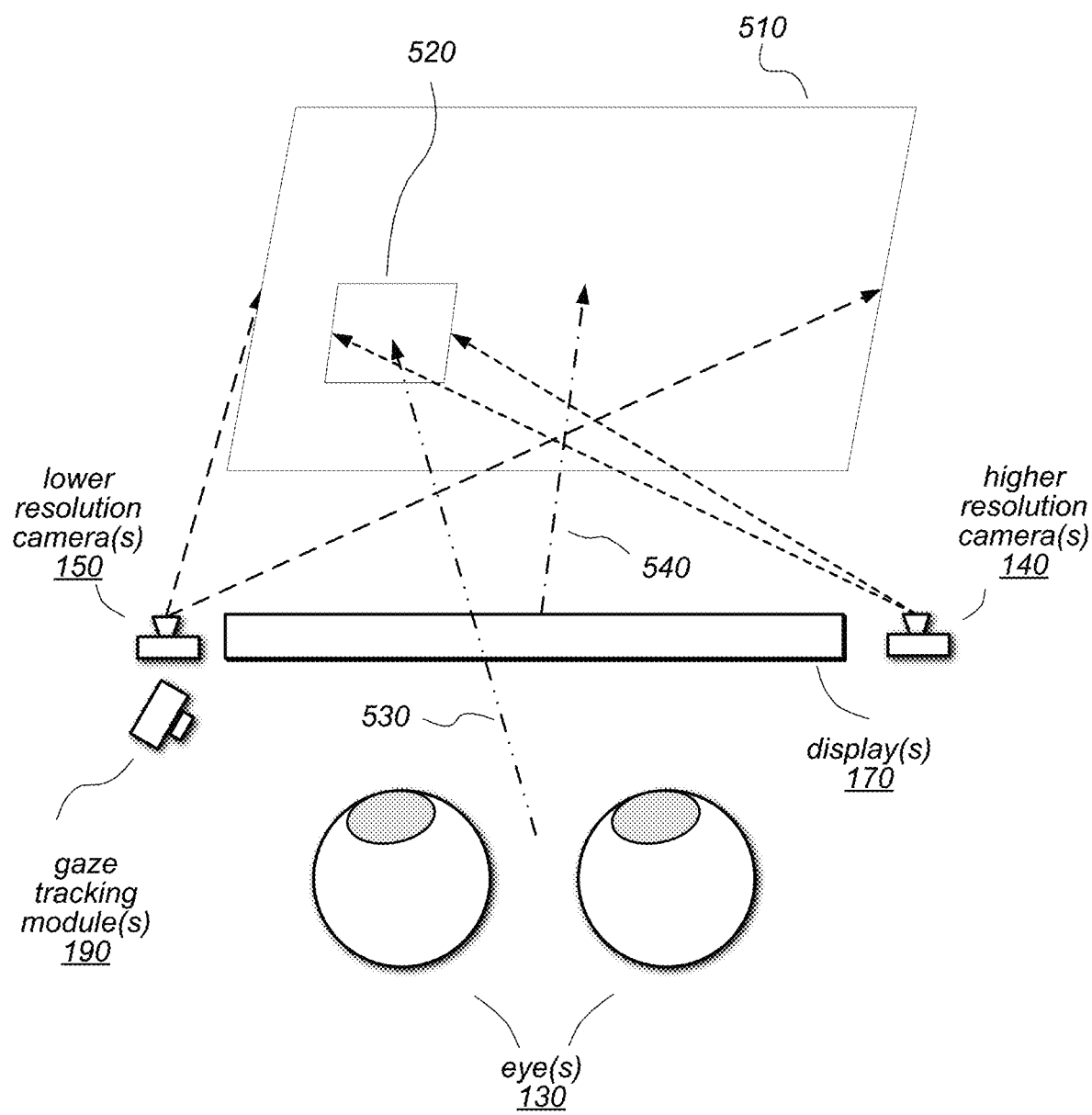

Similarly, FIG. 5 is a logical diagram illustrating one embodiment of system 100 capturing image data centered on multiple different angles of view. The physical arrangement of the components illustrated in FIG. 5 are merely for logical explanation and do not necessarily bear any similarity to any actual arrangement of components within any particular embodiment of a Predictive, Foveated Virtual Reality System as described herein. As illustrated in FIG. 5, system 100, may be configured to capture higher resolution image data, such as via higher resolution camera(s) 140 over a narrow (e.g., narrower) field of view, such as field of view 520. Field of view 520 may, in some embodiments correspond to, or be centered on, or be captured along, a user's line of sight 530 (or along a line of sight vector determined based on line of sight 530). Similarly, system 100, may be configured to capture lower resolution image data, such as via lower resolution camera(s) 150 over a wide (e.g., wider) field of view, such as field of view 450.

Take together FIG. 4 and FIG. 5 illustrate how, in some embodiments, system 100 may be configured to capture image data at a higher resolution along different angles of view that correspond to a user's line of sight, as the user's line of sight varies according to the user's eye movement. Thus, as the user's gaze moves, as detected by gaze tracking module(s) 190, system 100 may display different views which include higher resolution image data corresponding to the user's (current) line of sight. For example, when the user looks to the right, as illustrated in FIG. 4, system 100 may display a view that includes higher resolution in a field of view corresponding to the user's rightward line of sight, as illustrated by field of view 420. However, when the user looks to the left, as illustrated in FIG. 5, system 100 may display a view that includes higher resolution in a field of view corresponding to the user's leftward line of sight, as illustrated by field of view 520.

In some embodiments, system 100 may be configured to display image data for a wider field of view, such as illustrated by field of view 410 and field of view 510 that corresponds to an angle of view along the user's direct front (or along the system's direct front). Thus, field of view 410 and field of view 510 may represent the same (or a similar) field of view while field of view 420 and field of view 520 may represent different areas of higher resolution within the wider field of view, according to some embodiments.

Thus, in some embodiments, system 100 and/or processor(s) 110 may be configured to capture image data at multiple resolutions, combine and/or augment the captured image data and display a view to the user via display(s) 170. The display view may include at least some captured lower resolution image data, at least some captured higher resolution image data and possibly additional (e.g., non-captured) image data (e.g., to augment the captured image data), according to some embodiments. Higher resolution image data may be incorporated into the display view corresponding to a user's current line of sight.

Figure 6:
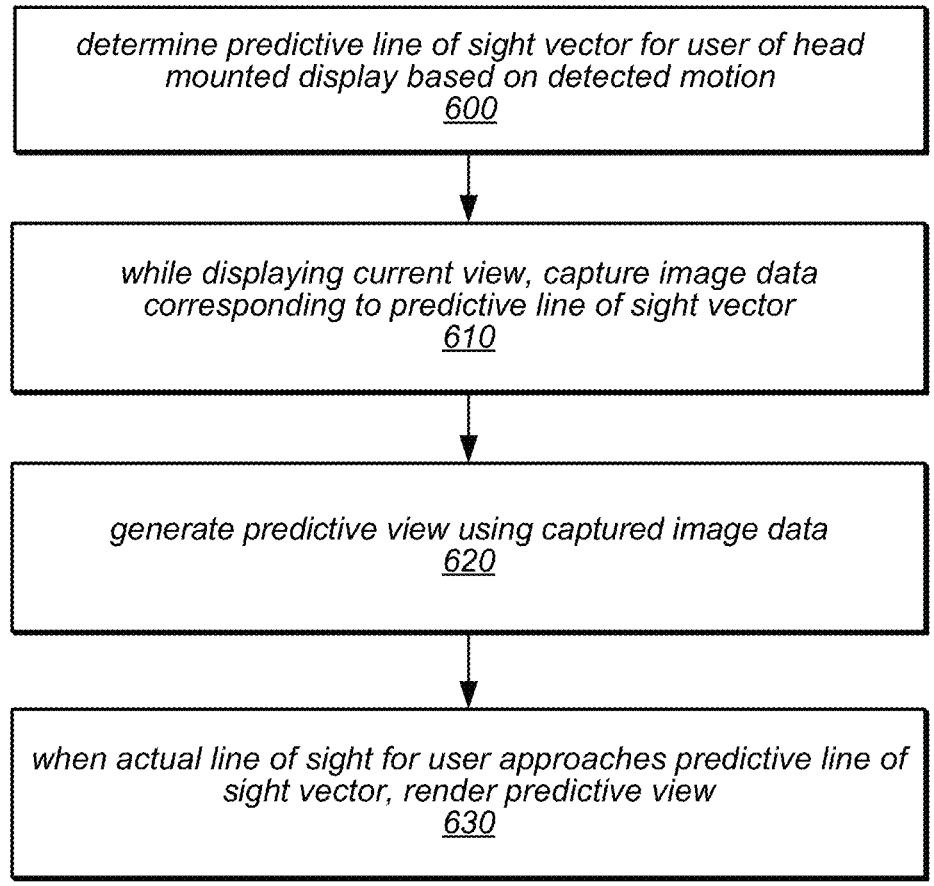
FIG. 6 is a flowchart illustrating one embodiment of a method for implementing a Predictive, Foveated Virtual reality system, as described herein.

FIG. 6 is flowchart illustrating one embodiment of a method for implementing a Predictive, Foveated Virtual reality system, as described herein. As in block 600, a system configured to implement a Predictive, Foveated Virtual reality system may determine a predictive line of sight vector for a user of the system. For example, system 100 may be configured to utilize various motion information related to a user's eye movement, as well as information regarding the user's head position, movement, trajectory, motion, alignment, etc., to determine a predictive line of sight vector for the user. The predictive line of sight vector may represent an angle of view along which the user may look at a point in the near future as compared to an angle of view along which the user is current looking, according to some embodiments.

The predictive line of sight vector may represent a future line of sight for the user according to fixed time period. For instance, system 100 may be configured to determine a predictive line of sight vector for a fixed number of ms in the future, according to some embodiments. In one embodiment, system 100 may be configured to determine a predictive line of sight vector based on, and to compensate for, a latency between capturing image data and displaying a computed view within system 100. Thus, for example, if there were a 14 ms latency (e.g., lag time) between system 100 capturing image data and displaying a final, completed (possibly augmented) view to the user, system 100 may be configured to determine (e.g., compute) a predictive line of sight vector corresponding to an angle of view along which the user may look 14 ms in the future (e.g., possibly based on the user's current position, alignment, head motion, eye motion, etc.). Thus, system 100 may be configured to present predictively captured images to a user without any noticeable delay between the time the user looks in a particular direction and the time the image corresponding to that direction is displayed, according to some embodiments. In other words, system 100 may be configured to predictively capture (and augment) images and present those predictively captured images to the user such that user may not experience discomfort frequently associated with and/or caused by delays in traditional virtual reality systems.

As noted above, system 100 may, in some embodiments, be configured to predictively capture images corresponding to predictive line of sight vectors representing future lines of sight for the user based, at least in part, on movement information, such as from motion tracking module(s) 180. In some embodiments, system 100 may only require a small, or slight, change in line of sight between a user's current (or actual) head position and a predictive head position in order to compensate for a latency (e.g., of the image capture, processing, pipeline delay, etc.) between image capture and image display within system 100. As will be discussed in more detail subsequently, the predictive line of sight along which system 100 captures images may be based on a user's head movement (e.g., motion, position, etc.), the user's eye motion, or a combination of the two, according to various embodiments.

As in block 610, system 100 may, in some embodiments, capture image data corresponding to the predictive line of sight vector while displaying a current view. For instance, system 100 may be configured to display a view corresponding to a user's current line of sight, but image data for that view may have been captured previously (e.g., before the user was looking along the current line of sight) using a predictive line of sight vector. While system 100 is displaying one view (e.g., using previously captured image data along a previous predictive line of sight vector) system 100 may be capturing image data corresponding to a predictive line of sight vector (e.g., to be display subsequently). System 100 may be configured to capture both lower resolution image data and/or higher resolution image data when capturing image data along a predictive line of sight vector. As described above, system 100 may be configured to capture lower resolution image data for a wider field of view while capturing higher resolution image data for a narrow field of view, whether capturing image data corresponding to a user's current line of sight or corresponding to a predictive line of sight vector, according to some embodiments.

The system 100 may also be configured to generate a predictive view using the captured image data, as in block 620. In a similar manner to which system 100 may generate a view corresponding to a user's current line of sight, system 100 may also generate a view corresponding to a predictive line of sight vector by combining, and possibly augmenting, captured image data (e.g., both lower resolution and higher resolution image data). When generating a predictive view corresponding to a predictive line of sight vector, system 100 may be configured to apply and/or perform various image procession and/or manipulation operations including one or more of, but not limited to, image translation operations, horizontal and vertical scaling, non-uniformity correction, filtering, non-uniformity reduction, color space conversion or other non-warping image editing operations, or image stabilization transformations, such as to captured image data, separate image data used to augment the view, or to the view (in whole or in part) itself. For example, system 100 may apply one or more image processing and/or manipulation operations when combining the captured lower resolution image data with the captured higher resolution image data, such as to blend (e.g., the edges of) the higher resolution image data with the lower resolution image data.

Additionally, the system 100 may, in response to the user's line of sight approaching the predictive line of sight vector, render the predictive view to a display viewable to the user, such as display(s) 170, of the system as in block 630, according to one embodiment. In some embodiments, system 100 may not actively determine when the user's line of sight is the same as, or approaches, the predictive line of sight vector, but may instead rely on the previous prediction and display the predictive view at a time corresponding to the predictive line of sight vector (e.g., at a time when the user's line of sight should be approaching the predictive line of sight vector). In other embodiments, system 100 may be configured to determine when the user is currently looking in a direction that corresponding to the predictive line of sight vector, such as by utilizing gaze tracking module(s) 190 and/or motion tracking module(s) 160, and display the predictive view when the user's line of sight approaches the predictive line of sight vector.

Thus, system 100 may be configured to display views that correspond to a user's current line of sight, when the user is looking along that current line of sight, even though generating that view (including capturing image data) may incur a significant latency or lag time. By utilizing predictive line of sight vectors, system 100 may, in some embodiments, pre-capture and/or pre-generate views to be displayed when the user looks along the predictive line of sight vector (e.g., when the user's current line of sight approaches the predictive line of sight vector). For instance, system 100 may be configured to predictively capture images, such as by rotating higher resolution camera(s) 140, or one or more components of higher resolution camera(s) 140, to correspond to a predicted head position and therefore capture images along a predictive line of sight for the user.

Figure 7:
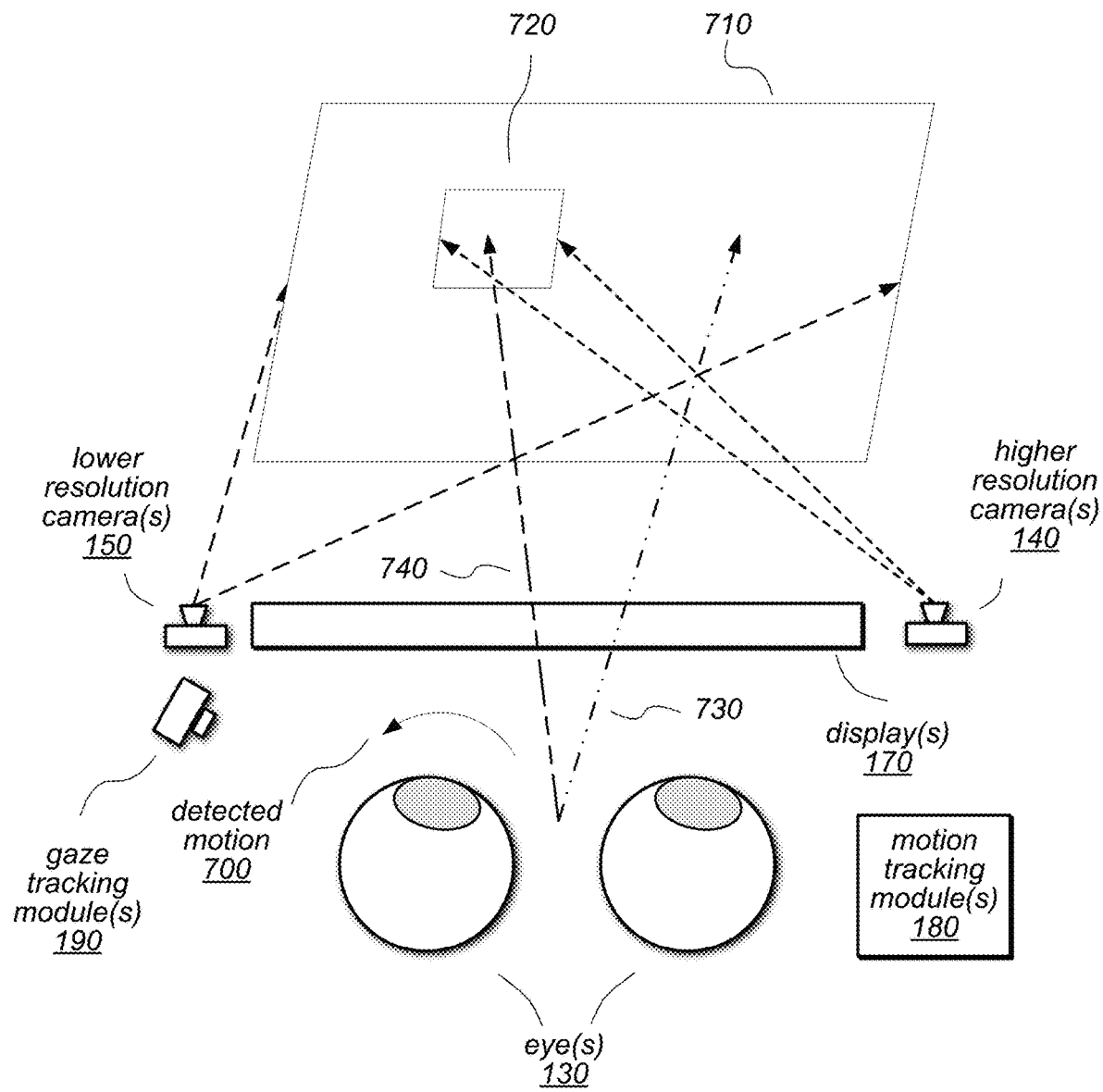
FIG. 7 is a logical diagram illustrating a Predictive, Foveated Virtual Reality System utilizing a predictive line of sight, according to one embodiment.

FIG. 7 is a logical diagram illustrating a Predictive, Foveated Virtual Reality System utilizing a predictive line of sight, according to one embodiment. As described above, a Predictive, Foveated Virtual Reality System, such as system 100, may be configured to generate views corresponding to predictive line of sight vectors for display when a user's line of sight approaches the predictive line of sight vector, according to some embodiments. Thus, system 100 may capture higher resolution image data for a field of view 720 corresponding to predictive line of sight vector 740, based on detected motion 700, while the user is currently looking along current line of sight 730. System 100 may also capture lower resolution image data for a field of view 710 corresponding to either current line of sight 730 or predictive line of sight vector 740, depending on various embodiments.

For example, as illustrated in FIG. 7, system 100 may determine detection motion 700 for the user. Detected motion 700 may be based on eye motion and/or head (or general) motion of the user. System 100 may utilize output from one or more sensors when determining detected motion 700. For example, system 100 may include one or more motion tracking module(s) 180, that may represent, or may include, one or more accelerometers, gyroscopes or a combination of components, which may be capable of detecting, monitoring, tracking or otherwise determine motion and/or movement of the user's head (whether due to the user moving just their head or due to other, general, body movements). Additionally, system 100 may include one or more gaze tracking module(s) 190 configured to detect, monitor, track, or otherwise determine motion of the user's eyes.

System 100 may determine predictive line of sight vector 740 based, at least in part, on information related to user eye motion and/or related to user head motion (or general body motion). For instance, in one embodiment, system 100 may be configured to utilize predictive line of sight vectors based only on eye motion with incorporating (or otherwise utilizing) head motion. In other embodiments, however, system 100 may determine predictive line of sight vectors based on both eye motion and head motion.

Figure 8:
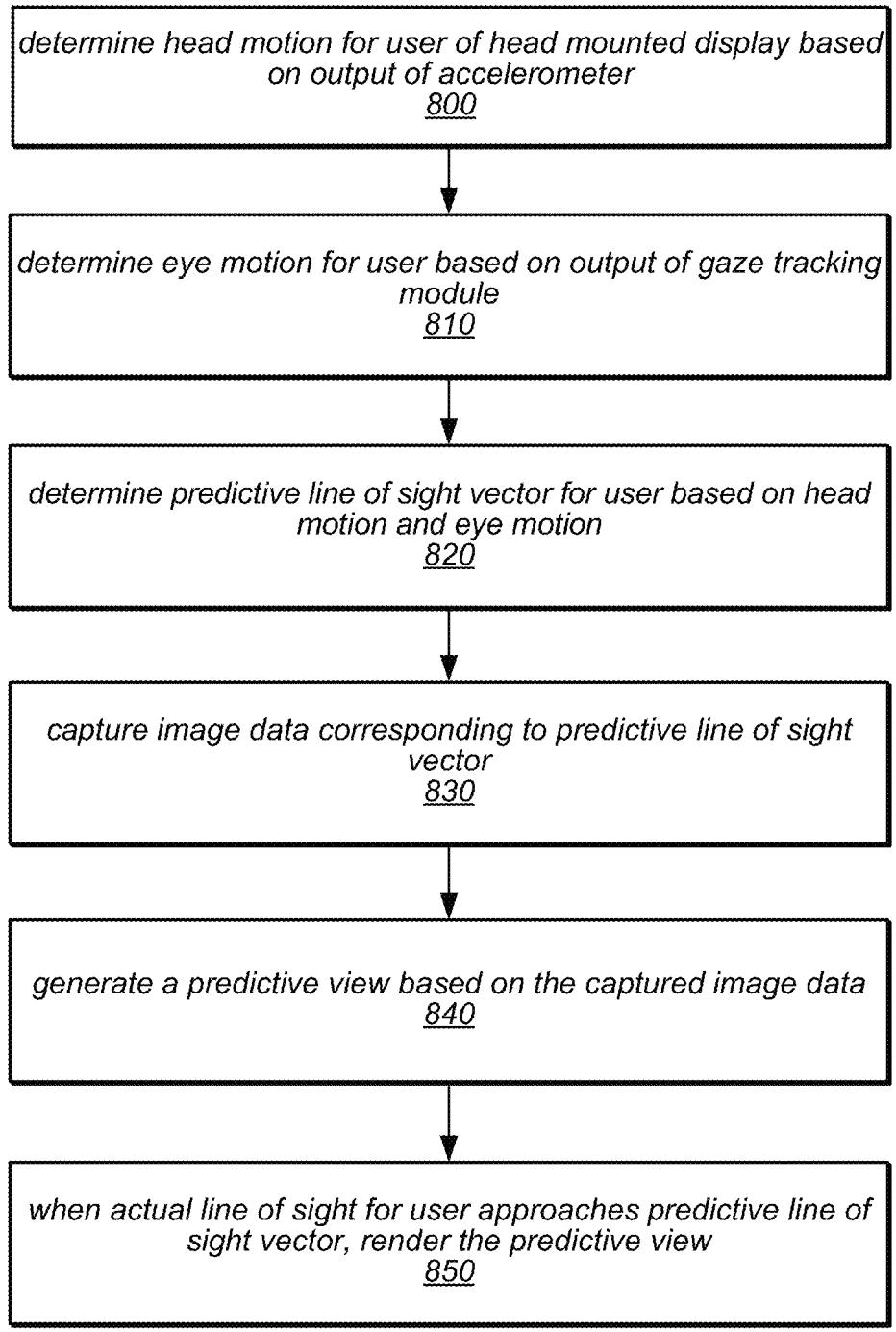
FIG. 8 is a flowchart illustrating one embodiment of a method for generating a displaying a predictive view using a Predictive, Foveated Virtual Reality System, according to one embodiment.

FIG. 8 is a flowchart illustrating one embodiment of a method for generating a displaying a predictive view using a Predictive, Foveated Virtual Reality System, according to one embodiment. As described above, a Predictive, Foveated Virtual Reality System, such as system 100, may be configured to generate a predictive view corresponding to a (potentially) future line of sight for a user of the system. The predictive line of sight vector may be based, at least in part, on a user's eye motion and/or head motion/movement, according to various embodiments.

As illustrated by block 800, system 100 may determine head motion for a user of the system, according to one embodiment. For example, motion detecting module(s) 180 may be configured to detect, monitor, track or otherwise determine motion of the user (e.g., the user's head movement) and convey information related to the detected motion to other components of system 100, such as processor(s) 110. For example, motion detecting module(s) 180 may include one or more accelerometers, one or more gyroscopes, other components configured to detect, monitor, track or otherwise determine motion, or a combination of such components (e.g., accelerometers and gyroscopes). Thus, processor(s) 110 may receive information related to user motion (e.g., head motion) from motion tracking module(s) 180 and use that information, along with other motion-related information, to determine a predictive line of sight vector.

Similarly, system 100 may be configured to determine eye motion for the user based on output of one or more gaze tracking module(s) 190, as in block 810. Gaze tracking module(s) 190 may be configured to detect, monitor, track or otherwise determine eye motion for the user and may convey information related to user eye motion to other components of system 100, such as processor(s) 110. For example, processor(s) 110 may receive information related to user eye motion from gaze tracking module(s) 190 and use that information, along with other motion-related information, to determine a predictive line of sight vector.

In some embodiments, system 100 may utilize eye motion, but not a user's head (and/or general) motion, when determining a predictive line of sight vector. In other embodiments, system 100 may utilize head (and/or general) motion, but not eye motion, when determining a predictive line of sight vector. In yet other embodiments however, system 100 may be configured to utilize both eye motion and head (and/or general) motion, when determining a predictive line of sight vector. System 100 may, according to some embodiments, be configured to combine a motion vector corresponding to a user's eye motion with a motion vector corresponding to the user's head (and/or general) motion when determining a predictive line of sight vector. Thus, system 100 may be configured to determine a predictive line of sight vector for a user based on head motion and eye motion, as in block 820.

As noted above, the predictive line of sight vector may represent an angle of view along which the user may look at a point in the near future as compared to an angle of view along which the user is current looking, according to some embodiments. In one embodiment, system 100 may be configured to determine a predictive line of sight vector based on, and to compensate for, a latency between capturing image data and displaying a computed view within system 100. For instance, in some embodiments system 100 may be configured to extrapolate predictive line of sight vector 740 based on detected motion 700 and the user's current line of sight 730.

The system may then capture image data corresponding to the predictive line of sight vector, as illustrated in block 830. As described above, system 100 may be configured to capture higher resolution image data and/or lower resolution image data corresponding to a predictive line of sight vector. As illustrated in block 840, system 100 may generate a predictive view based on the captured image data, in some embodiments. In some embodiments, system 100 may capture the image data and generate the predictive view while the user is looking in a direction different from the predictive line of sight vector. For example, the system may capture the image data and generate the predictive view while a view corresponding to another light of sight (e.g., a line of sight different from the predictive line of sight vector) is displayed to the user. The system 100 may then render the predictive view in response to the user's line of sight approaching the predictive line of sight vector.

Figure 9:
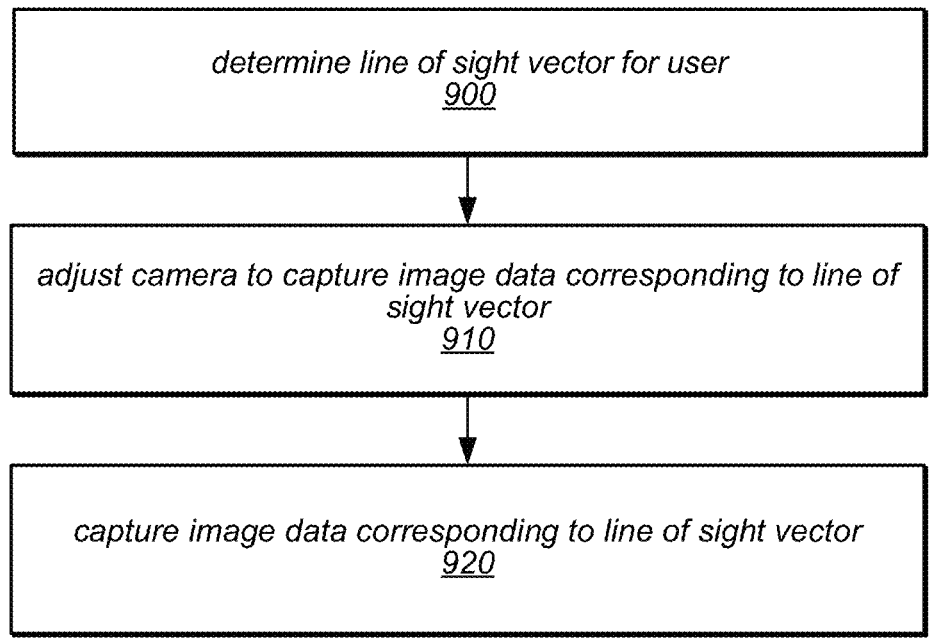
FIG. 9 is a flowchart illustrating one embodiment of a method for implementing Predictive, Foveated Virtual Reality System, as described herein.

FIG. 9 is a flowchart illustrating one embodiment of a method for implementing Predictive, Foveated Virtual Reality System, as described herein. In order to capture image data corresponding to various line of sight vectors (whether current, actual or predictive) along different angles of views, system 100 may be configured to adjust one or more cameras, according to some embodiments. For instance, as in block 900, system 100 may determine a line of sight vector for a user. In some embodiments, this line of sight vector may represent the user's current line of sight (e.g., line of sight 330, 430 and/or 530), while in other embodiments, this line of sight vector may represent a predictive line of sight vector (e.g., predictive line of sight 740).

System 100 may be configured to adjust one or more cameras to capture image data corresponding to the predictive line of sight vector, according to some embodiments. For example, higher resolution camera(s) 140 may be configured to capture image data across multiple angles of view, such as by adjusting one or more features of the camera(s). Higher resolution camera(s) 140 may comprise one or more adjustable features, either hardware features or software features, that may be configured to change the angle, view, line of sight, etc., along which the camera(s) capture image data. For instance, in one embodiment, higher resolution camera(s) 140 may be configured to be rotated through a range of angles in order to capture images from a range of angle. Thus, system 100 may, in some embodiments, be configured to predictively capture images with higher resolution camera(s) 140, such as by rotating, actuating, or otherwise adjusting, higher resolution camera(s) 140 to an angle corresponding to a predicted head position for the user (e.g., a next head position), possibly based on output from motion tracking module(s) 180.

In one embodiment higher resolution camera(s) 140 may include one or more hardware, software and/or firmware, features configured to perform image processing mechanisms to compensate for motion of the camera during image capture and system 100 may be configured to utilize one or more image processing features to adjust the higher resolution camera(s) 140 in order to capture image data along a line of sight vector that is not directly to the user's (or the system's) front. For instance, system 100 and/or higher resolution camera(s) 140 may include one or more Optical Image Stabilization (OIS) features that, in addition to being able to compensate for unintended camera motion, may be utilized by system 100 to predictively capture images along predictively lines of sight, as described here. As another example, in some embodiments higher resolution camera(s) 140 may comprise one more movable, actuatable, or otherwise adjustable, lens allowing the camera(s) to capture images from a range of angles. Similarly, in some embodiments, higher resolution camera(s) 140 may comprise one or more moveable (or adjustable) mirrors allowing the camera(s) to capture images from a range of angles.

Additionally, in some embodiments, system 100 may include a single, wide field-of-view (FOV) camera which system 100 may be configured to adjust, such as with an OIS (or similar) mechanism, according to anticipated user head movements in order to display a predictively captured image at the right (correct) moment when the user actually looks in the anticipated direction. In some embodiments, system 100 may utilize only anticipated head movement (and not anticipated gaze direction), since the frame of reference may be to the front of the system or head mounted display). Therefore, camera movement (e.g., adjustment) may be determined based on a trajectory of the user's head (e.g., according to output of motion tracking module 180), and not any absolute gaze direction. System 100 may, in some embodiments, be configured to utilize predictive capture, rather than re-computation (or manipulation) of the FOV because, in general, objects at different distances behave differently under camera perspective rotation and simply re-computing may not result in a proper (or correct) looking image for the predictive view.

Thus, system 100 may be configured to adjust (or cause to be adjusted) higher resolution camera(s) 140 and/or to adjust one or more mechanisms, lenses, mirrors, or other features of higher resolution camera(s) 140 (such as one or more OIS components/features) to capture image data corresponding to a (current, actual, or predictive) line of sight vector for a user. When utilizing predictive line of sight, higher resolution camera(s) 140 may not, during use, capture image data corresponding to the user's current (or actual) line of sight, but may general capture image data corresponding to a prediction of the user's future line of sight (although if the user is not moving, a current and a predictive line of sight for the user may coincide), according to some embodiments.

System 100 may then capture image data corresponding to the (e.g., predictive) line of sight vector, as in block 920. As described previously, system 100 may capture both lower resolution image data and higher resolution image data, as described above. System 100 may also generate and display a view corresponding to the line of sight vector using the capture image data.

Figure 10:
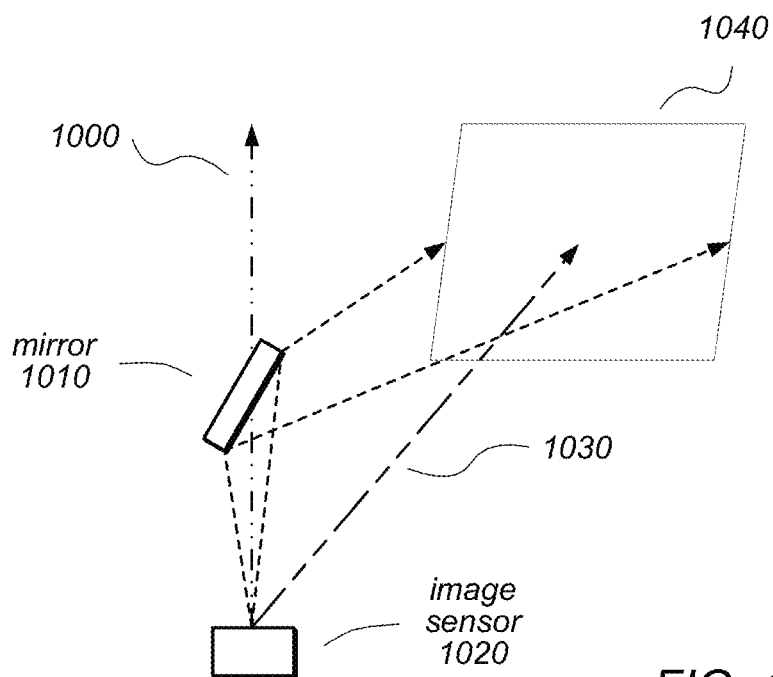
FIGS. 10 and 11 are a logical diagrams illustrating embodiments of a camera configured to capture image data over a range of view angles.

As described above, system 100 may be configured to capture image data, such as higher resolution image data via higher resolution camera(s) 140, over a range of angle views. FIG. 10 is a logical diagram illustrating one embodiment of a mechanism for enabling a camera to capture image data over a range of angle views. For instance, a camera, such as higher resolution camera(s) 140, may include an image sensor 1020 configured to capture image data from a single angle of view 1000 (e.g., a direction), or possibly over a narrow range of directions.

However, in some embodiments, a camera may also comprise a movable or adjustable mirror 1010 configured to reflect light (and therefore images) from a wider range of angles onto image sensor 1020. The distances, angles and arrangement of components illustrated in FIG. 10 are exaggerated for ease of illustration and the actual distances, angles and arrangement of components may be different and may vary from embodiment to embodiment.

Thus, when capturing image data along a line of sight vector 1030, system 100 may adjust mirror 1010 in order to allow image sensor 1020 to capture image data from field of view 1040, which may not be otherwise possible without changing the entire orientation of the image sensor. In some embodiments, system 100 may be configured such that processor(s) 110 communicate with higher resolution camera(s) 140 to adjust mirror 1010. In other embodiments, gaze tracking module(s) 190 may be communicably connected to mirror 1010 (or to a camera that includes image sensor 1020) thereby allowing gaze tracking module(s) 190 to cause mirror 1010 to be adjusted as needed to capture image data along various line of sight vectors.

Figure 11:
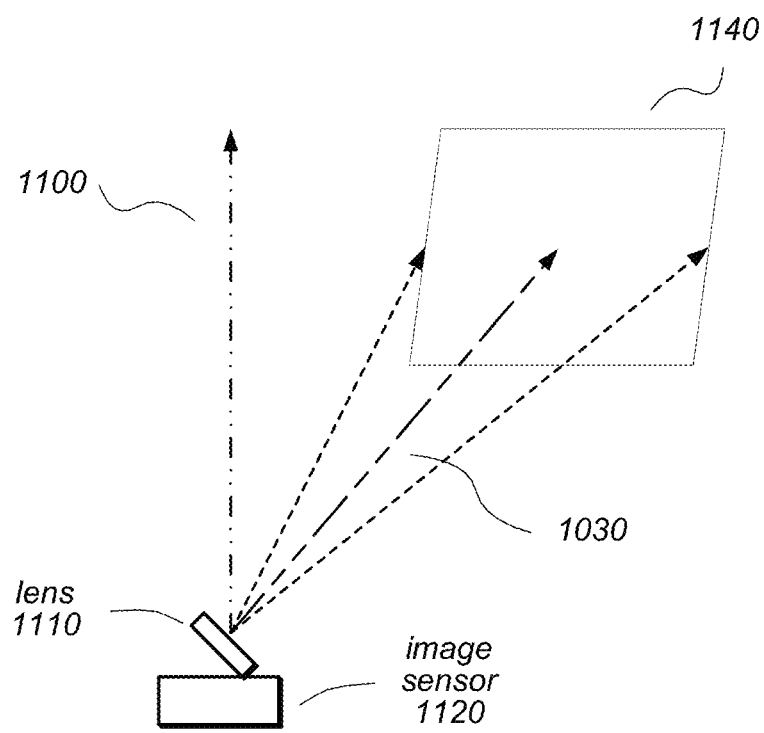

FIG. 11 is a logical diagram illustrating another embodiment of a mechanism for enabling a camera to capture image data over a range of angle views. As when FIG. 10, a camera, such as higher resolution camera(s) 140, may include an image sensor 1120 configured to capture image data from a single angle of view 1100 (e.g., a direction), or possibly over a narrow range of directions.

However, in some embodiments, a camera may also comprise a movable or adjustable lens 1110 configured to collect light (and therefore images) from a wider range of angles onto image sensor 1120. The distances, angles and arrangement of components illustrated in FIG. 11 are exaggerated for ease of illustration and the actual distances, angles and arrangement of components may be different and may vary from embodiment to embodiment.

Thus, when capturing image data along a line of sight vector 1130, system 100 may adjust lens 1110 in order to allow image sensor 1120 to capture image data from field of view 1140, which may not be otherwise possible without changing the entire orientation of the image sensor. In some embodiments, system 100 may be configured such that processor(s) 110 communicate with higher resolution camera(s) 140 to adjust lens 1110. In other embodiments, gaze tracking module(s) 190 may be communicably connected to lens 1110 (or to a camera that includes image sensor 1020) thereby allowing gaze tracking module(s) 190 to cause lens 1110 to be adjusted as needed to capture image data along various line of sight vectors.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
 a lower resolution camera configured to capture image data at a lower resolution;
 a higher resolution camera configured to capture image data at a higher resolution, wherein image data captured by the higher resolution camera at the higher resolution comprises more pixels per inch image than data captured by the lower resolution camera at the lower resolution, wherein the higher resolution camera is configured to capture image data over a narrower field of view than the lower resolution camera;
 a gaze tracking module configured to determine a line of sight for a user of the system;
 an adjustable mirror coupled to the gaze tracking module and configured to reflect light along the user's line of sight to the higher resolution camera; and
 a renderer module configured to render, on a display viewable by the user, an image of a view along the user's line of sight, based at least in part on image data captured by the lower resolution camera and image data captured by the higher resolution camera using light reflected by the adjustable mirror.

2. The system of claim 1, wherein the adjustable mirror is configured to reflect light to the higher resolution camera from a plurality of vectors outside a current view of the higher resolution camera.

3. The system of claim 1, further comprising one or more processors configured to adjust the adjustable mirror to reflect light along the user's line of sight to the higher resolution camera.

4. The system of claim 1, wherein the gaze tracking module is configured to adjust the mirror to reflect light along the user's line of sight to the higher resolution camera.

5. The system of claim 1, wherein to determine the line of sight for the user, the gaze tracking module is configured to detect eye motion for the user.

6. The system of claim 1, wherein the system is further configured to:
 determine a predictive line of sight vector representing a potential line of sight for the user at a particular time in the future based, at least in part, on a current movement of the user's eyes and a current movement of the user's head; and
 adjust the mirror to reflect light from the predictive line of sight for the user to the higher resolution camera.

7. The system of claim 6, wherein the processor is further configured to collect image data captured by the higher resolution camera along the predictive line of sight vector prior to the line of sight vector for the user approaching the potential line of sight.

8. The system of claim 6, further comprising one or more accelerometers configured to determine a current movement of the user's head based on output of the one or more accelerometers, wherein the predictive line of sight vector is determined based at least in part on the current movement of the user's head.

9. The system of claim 6, wherein the system is further configured to determine the particular time in the future based, at least in part, on a length of time required to capture and render to the display image data captured by the lower resolution camera and the higher resolution camera.

10. The system of claim 1, further comprising a head mounted display, wherein the head mounted display comprises the lower resolution camera, the higher resolution camera, the gaze tracking module, the adjustable mirror and the display viewable by the user.

11. A method, comprising:
 determining, by a gaze tracking module, a line of sight for a user of a head mounted display;
 adjusting an adjustable mirror coupled to the gaze tracking module to reflect light along the line of sight to a higher resolution camera;
 capturing, via a lower resolution camera, lower resolution image data corresponding to a lower resolution field of view along the line of sight;
 capturing, via the higher resolution camera, higher resolution image data corresponding to a higher resolution field of view along the line of sight, wherein the higher resolution image data comprises a higher pixel density than the lower resolution image data and wherein the higher resolution field of view is narrower than the lower resolution field of view; and
 rendering, on a display viewable by the user, an image of a view along the line of sight based at least in part on image data captured by the higher resolution camera using light reflected by the adjustable mirror and based at least in part on image data captured by the lower resolution camera.

12. The method of claim 11, wherein said adjusting comprises adjusting the adjustable mirror to reflect light to the higher resolution camera from a vector outside a current view of the higher resolution camera.

13. The method of claim 11, wherein said adjusting is performed by the gaze tracking module.

14. The method of claim 11, wherein said adjusting is performed by the one or more processors of the head mounted display based on output of the gaze tracking module.

15. The method of claim 11, wherein said determining the line of sight comprises detecting, by the gaze tracking module, eye motion for the user, wherein the line of sight is determined based at least in part on the detected eye motion.

16. The method of claim 11, further comprising:
 determining a predictive line of sight vector representing a potential line of sight for a user of a virtual reality system at a particular time in the future based, at least in part, on motion information regarding the user's current movement; and
 adjusting the adjustable mirror to reflect light from the predictive line of sight to the higher resolution camera.

17. The method of claim 16, further comprising capturing higher resolution image data along the predictive line of sight using light reflected by the adjustable mirror prior to the particular time.

18. The method of claim 16, further comprising determining, by one or more accelerometers of the head mounted display, a current movement of the user's head, wherein the predictive line of sight vector is determined based at least in part on the current movement of the user's head.

19. The method of claim 16, further comprising determining the particular time in the future based, at least in part, on a length of time required to capture and render image data captured by the lower resolution camera and the higher resolution camera.

20. The method of claim 16, wherein the rendered image is viewable by the user at the particular time.

* * * * *